US011213917B2

(12) United States Patent
Zhang

(10) Patent No.: US 11,213,917 B2
(45) Date of Patent: Jan. 4, 2022

(54) FUSION WELDING OF FERROUS ALLOY COMPONENT PARTS USING LOW CARBON STEEL BAND

(71) Applicant: GM GLOBAL TECHNOLOGY OPERATIONS LLC, Detroit, MI (US)

(72) Inventor: Shun X. Zhang, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 479 days.

(21) Appl. No.: 16/189,273

(22) Filed: Nov. 13, 2018

(65) Prior Publication Data

US 2020/0147724 A1    May 14, 2020

(51) Int. Cl.
| | |
|---|---|
| *B23K 26/32* | (2014.01) |
| *B23K 26/242* | (2014.01) |
| *F16H 57/023* | (2012.01) |
| *F16H 48/38* | (2012.01) |
| *F16H 57/032* | (2012.01) |
| *B23K 101/00* | (2006.01) |
| *B23K 103/02* | (2006.01) |

(52) U.S. Cl.
CPC ............ *B23K 26/32* (2013.01); *B23K 26/242* (2015.10); *F16H 48/38* (2013.01); *F16H 57/023* (2013.01); *F16H 57/032* (2013.01); *B23K 2101/008* (2018.08); *B23K 2103/02* (2018.08)

(58) Field of Classification Search
CPC .. B23K 26/32; B23K 26/242; B23K 2103/02; F16H 48/38; F16H 57/023; F16H 57/032
See application file for complete search history.

(56) References Cited

U.S. PATENT DOCUMENTS

| | | | | |
|---|---|---|---|---|
| 4,790,473 | A * | 12/1988 | Narasimhan | B23K 15/0073 228/206 |
| 6,589,671 | B1 * | 7/2003 | Kehrer | B23K 15/0073 428/683 |
| 9,555,500 | B2 * | 1/2017 | Strandell | F16C 33/62 |
| 2017/0089440 | A1 * | 3/2017 | Shirakawa | B23K 26/24 |
| 2018/0306300 | A1 * | 10/2018 | Rothstein | B23F 1/06 |

FOREIGN PATENT DOCUMENTS

| | | | | |
|---|---|---|---|---|
| CN | 105209214 A | | 12/2015 | |
| EP | 1719572 A2 * | | 11/2006 | B23K 33/00 |

OTHER PUBLICATIONS

Yu et al., "Laser welding of cast iron and carburized steel for differential gear," Journal of Mechanical Science and Technology, vol. 11 (2011) pp. 2887-2893.

* cited by examiner

*Primary Examiner* — Thomas C Diaz
(74) *Attorney, Agent, or Firm* — Vivacqua Crane PLLC

(57) ABSTRACT

A method of fusion welding two ferrous alloy component parts, at least one of which is considered unweldable, involves placing a low carbon steel band into a groove defined in part by each of the ferrous alloy component parts and then conveying a concentrated energy source along a welding line that overlaps the low carbon steel band to melt the steel band along with adjacent portions of the ferrous alloy component parts to form a blended alloy weld pool. The blended alloy weld pool solidifies behind the forward movement of the concentrated energy source into a weld joint that fusion welds the ferrous alloy component parts together. The ferrous alloy component parts may include a differential casing and a ring gear. In that regard, a differential casing and ring gear assembly that includes a weld joint is also disclosed.

13 Claims, 4 Drawing Sheets

FUSION WELDING OF FERROUS ALLOY COMPONENT PARTS USING LOW CARBON STEEL BAND

INTRODUCTION

The manufacture of certain products—especially complex multi-component structures such as automobiles—may require two ferrous alloy component parts to be joined. The alloy content of one or both of the ferrous alloy parts may render fusion welding of the parts difficult. Indeed, as the carbon content or the carbon equivalency of a ferrous alloy increases, the hardness of the alloy increases and, consequently, the weldability of the alloy decreases due to the formation hard and brittle microstructural phases within the fusion zone and the surrounding heat-affected zone when the molten material created during the prescribed welding operation solidifies rapidly. These hard and brittle microstructural phases are more susceptible to various forms of cracking including quench cracking from thermal shock and/or hydrogen induced cold cracking. To that end, mechanical fasteners such as bolts, rivets, flow drill screws, rivet nuts, and the like are typically used when ferrous alloy parts need to be joined but the weldability of one or both of the parts is not ideal. Compared to fusion welding operations, however, the joining of ferrous alloy parts with mechanical fasteners adds weight to the joined assembly and is more time-consuming and labor intensive. The ability to fusion weld ferrous alloy parts when one or both of the parts has a low-weldability could thus improve the efficiency and economics of a wide variety of manufacturing practices.

SUMMARY OF THE DISCLOSURE

A method of fusion welding two ferrous alloy component parts, wherein at least one of the ferrous alloy component parts is considered unweldable, may include several steps according to one embodiment of the present disclosure. In one step, a first ferrous alloy component part is provided. The first ferrous alloy component part has a surface that defines a notch and, further, has an alloy composition that includes greater than 0.50 wt % carbon or a carbon equivalency of greater than 0.50 wt %. In another step, a second ferrous alloy component part is provided. The second ferrous alloy component part has a surface that defines a notch and, further, has an alloy composition that includes greater than 0.50 wt % carbon or a carbon equivalency of greater than 0.50 wt %. In yet another step, the first ferrous alloy component part and the second ferrous alloy component part are brought together so that the notch defined in the surface of the first component part and the notch defined in the surface of the second ferrous alloy component part cooperate to form a groove. In still another step, a low carbon steel band is placed into the groove. The low carbon steel band has an alloy composition that includes 0.01 wt % to 0.1 wt % carbon. And, in still another step, the low carbon steel band is impinged with a concentrated energy source, and the concentrated energy source is conveyed along a welding line that overlaps the low carbon steel band to melt the steel band along with an adjacent portion of the first ferrous alloy component part and an adjacent portion of the second ferrous alloy component part to form a blended alloy weld pool. The blended alloy weld pool solidifies into a weld joint that fusion welds the first and second ferrous alloy component parts together.

The aforementioned method may include additional steps or be further defined. For example, each of the notch defined in the surface of the first ferrous alloy component part and the notch defined in the surface of the second ferrous alloy component part may extend circumferentially around its respective surface to form a circumferential groove around the first and second ferrous alloy component parts. In that case, the low carbon steel band that is placed into the circumferential groove may be a low carbon steel ring. In another example, the concentrated energy source may be a laser beam wherein foreign metal is not introduced into the blended alloy weld pool via a filler wire. In another example, the first ferrous alloy component part may be constructed from ductile cast iron having an alloy composition that includes iron along with 3.2 wt % to 3.6 wt % carbon, 2.2 wt % to 2.8 wt % silicon, and one or more nodulizing elements selected from magnesium or cerium, and the second ferrous alloy component part may be constructed from case hardened low carbon alloy steel in which an uncarburized bulk steel portion of the second ferrous alloy component part has an alloy composition that includes iron and up to 4.0 wt % alloying elements including 0.17 wt % to 0.23 wt % carbon. The first ferrous alloy component part may be a differential casing and the second ferrous alloy component part may be a ring gear.

When the first ferrous alloy component part is a differential casing and the second ferrous alloy component part is a ring gear, the differential casing may include an attachment flange having an axially facing annular front surface that defines a continuous notch extending circumferentially around the axially facing annular front surface, and the ring gear may include an annular back surface and a profiled front surface defining a plurality of gear teeth with the annular back surface including an axially-projecting circular ridge terminating in an axially facing annular plateau surface that defines a continuous notch extending circumferentially around the axially facing annular plateau surface. The continuous notch defined in the axially facing annular front surface of the attachment flange and the continuous notch defined in the axially facing annular plateau surface of the ring gear cooperate to form a circumferential groove around the differential casing and the ring gear. The low carbon steel band that is placed into the circumferential groove may be a low carbon steel ring and, additionally, may be fully melted by the concentrated energy source and thus may be fully incorporated into the weld joint.

A method of fusion welding two ferrous alloy component parts, wherein at least one of the ferrous alloy component parts is considered unweldable, may include several steps according to another embodiment of the present disclosure. In one step, a ring gear is slid over an elongated body of a differential casing to bring an annular back surface of the ring gear into contact with an axially facing annular front surface of an attachment flange of the differential casing. The ring gear is constructed from case hardened low carbon alloy steel and the differential casing is constructed from ductile cast iron. Additionally, the annular back surface of the ring gear and the axially facing annular front surface of the attachment flange of the differential casing cooperate to form a circumferential groove around the ring gear and the differential casing. In another step, a low carbon steel ring is placed into the circumferential groove. The low carbon steel ring has an alloy composition that includes 0.01 wt % to 0.1 wt % carbon. In yet another step, the low carbon steel ring is impinged with a concentrated energy source, and the concentrated energy source is conveyed along a welding line that overlaps the low carbon steel ring to fully melt the steel ring along with an adjacent portion of the ring gear and an adjacent portion of the differential casing to form a blended alloy weld pool. The blended alloy weld pool solidifies into a weld joint that circumscribes and fusion welds the ring gear and differential casing together.

The aforementioned method may include additional steps or be further defined. For example, the concentrated energy source may be a laser beam wherein foreign metal is not introduced into the blended alloy weld pool via a filler wire. In another example, the ring gear may include an uncarburized bulk steel portion and an outer carburized hardened case overlying the uncarburized bulk steel portion. The uncarburized bulk steel portion may have an alloy composition that includes iron and up to 4.0 wt % alloying elements including 0.17 wt % to 0.23 wt % carbon, and the outer carburized hardened case may have an alloy composition that includes iron and 0.6 wt % to 1.0 wt % carbon. Moreover, a portion of the annular back surface of the ring gear that cooperates with the axially facing annular front surface of the attachment flange to form the circumferential groove is part of the uncarburized bulk steel portion. In another example, the ductile cast iron of the differential casing may have an alloy composition that includes iron along with 3.2 wt % to 3.6 wt % carbon, 2.2 wt % to 2.8 wt % silicon, and one or more nodulizing elements selected from magnesium or cerium. In yet another example, a continuous circumferential notch may be defined in the annular back surface of the ring gear and, likewise, a continuous circumferential notch may be defined in the axially facing annular front surface of the attachment flange of the differential casing. The two notches may cooperate to form the circumferential groove. Additionally, the continuous notch defined in the annular back surface of the ring gear may be defined in an axially facing annular plateau surface of an axially-projecting circular ridge that protrudes beyond surrounding portions of the annular back surface.

A differential casing and ring gear assembly may include several features according to one embodiment of the present disclosure. The differential casing and ring gear assembly may include a differential casing and a ring gear. The differential casing includes an elongated body that extends along an axis of rotation of the casing between a first axle hub and a second axle hub, and further includes an attachment flange that surrounds and extends radially outwardly from a central portion of the elongated body located between the first axle hub and the second axle hub. The differential casing is constructed from ductile cast iron having an alloy composition that includes 3.2 wt % to 3.6 wt % carbon. The ring gear includes an annular body having an inner circumferential surface that is frictionally seated against an exterior surface of the central portion of the elongated body of the differential casing. The ring gear is constructed from case hardened low alloy carbon steel such that the ring gear has an uncarburized bulk steel portion and an outer carburized hardened case overlying the uncarburized bulk steel portion. The uncarburized bulk steel portion has an alloy composition that includes 0.17 wt % to 0.23 wt % carbon. The differential casing and ring gear assembly further includes a weld joint that circumscribes the attachment flange of the differential casing and the annular body of the ring gear and fusion welds differential casing and the ring gear together. The weld joint has an alloy composition that includes less carbon than each of the alloy composition of the ductile cast iron and the alloy composition of the uncarburized bulk steel portion of the ring gear.

The differential casing and ring gear assembly may include additional structure or be further defined. For instance, the weld joint may be formed at a portion of the annular body of the ring gear where the outer carburized hardened case is not present. Still further, the weld joint may be formed between the attachment flange of the differential casing and an axially-projecting circular ridge that protrudes beyond surrounding portions of an annular back surface of the ring gear. The annular back surface of the ring gear may be opposite a profiled annular front surface of the ring gear that defines a plurality of gear teeth.

DETAILED DESCRIPTION

Figure 1:
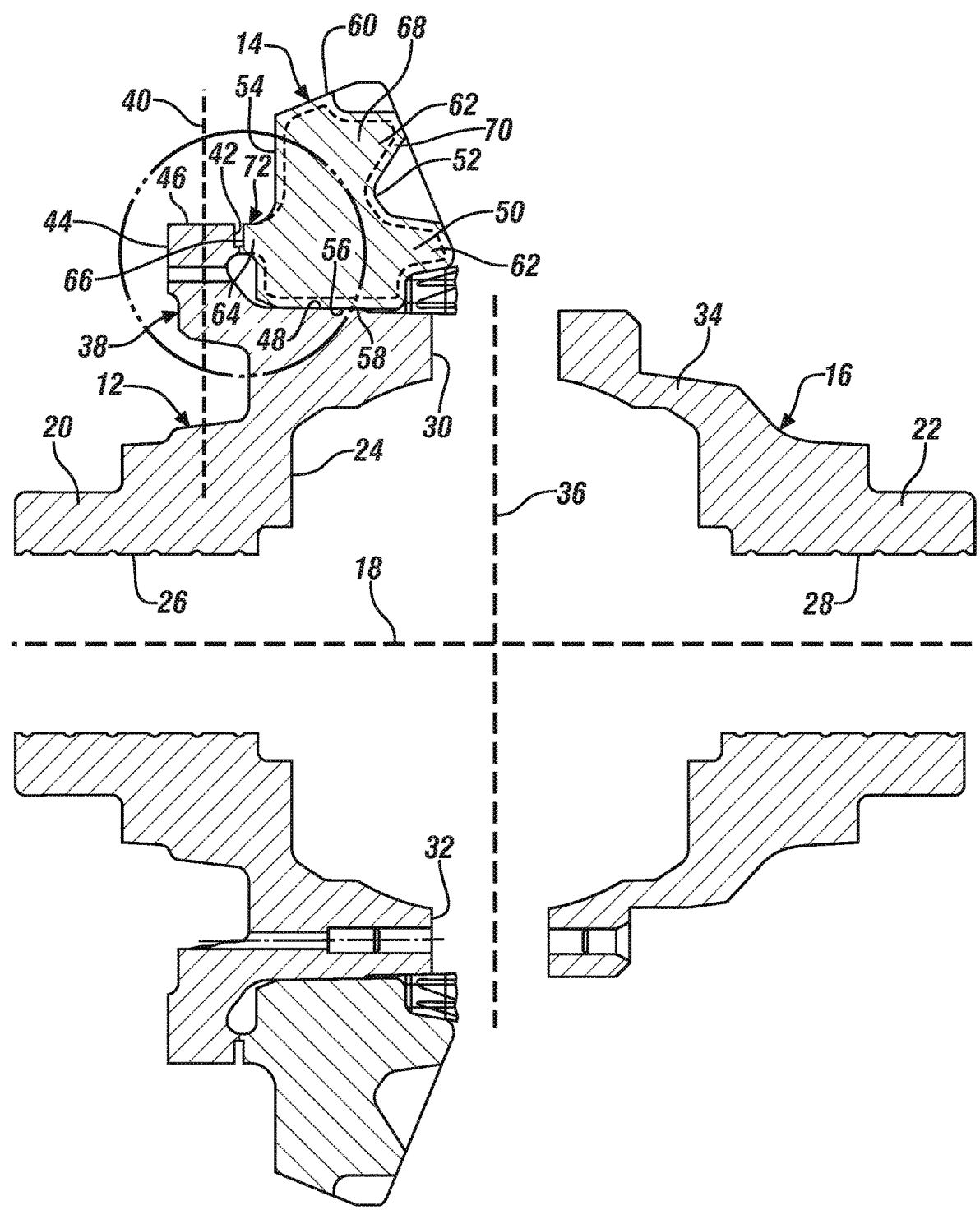
FIG. 1 is a cross-sectional view of a differential casing and a ring gear assembled together in preparation for fusion welding according to one embodiment of the present disclosure.

The present disclosure relates to fusion welding two ferrous alloy component parts with a concentrated energy source (e.g., a laser beam, an electron beam, etc.) when one or both of the ferrous alloy parts is considered unweldable because it possesses either a high carbon content or a high carbon equivalency. For purposes of the present disclosure, a carbon content or a carbon equivalency of greater than 0.50 wt % is considered to render a ferrous alloy unweldable. The two ferrous alloy component parts may be fusion welded together according to practices of this disclosure by placing a low carbon steel band within a groove that is defined at least in part by each of the ferrous alloy component parts. Then, during welding, the concentrated energy source is conveyed along the welding line, which overlaps the low carbon steel band. This causes the low carbon steel band to melt along with adjacent portions of each ferrous alloy component part to produce a blended alloy molten weld pool that solidifies in the wake of the forward movement of the energy source. The resultant weld joint has a carbon content that is less than that of both the ferrous alloy component parts, which, in turn, renders the solidified joint and its surrounding heat-affected zone less susceptible to cracking and other forms of joint failure.

An illustrative embodiment of the present disclosure is described in the context of a differential casing and ring gear assembly, although it should be appreciated that the same method can be practiced on other ferrous alloy component parts as well. Referring now to FIGS. 1-6, a differential casing and ring gear assembly 10 (hereafter "assembly" for short) is formed by fusion welding together a differential casing 12 and a ring gear 14 using a concentrated energy source such as a laser beam, an electron beam, a MIG welding arc, or a TIG welding arc. The differential casing 12 is constructed from cast iron and the ring gear 14 is constructed from low carbon alloy steel that may or may not be case hardened. The specifics of how the differential case 12 and the ring gear 14 are fusion welded together is described in greater detail below. Preferably, the two ferrous alloy component parts 12, 14 are welded together using a laser beam without adjusting the composition of the laser weld joint by introducing foreign metal into the joint via a filler wire.

The differential casing 12 includes an elongated body 16 that extends along an axis of rotation 18 of the casing 12 from a first axle hub 20 to a second axle hub 22. The elongated body 16 defines an interior chamber 24, which houses a differential gear set (FIG. 6) when the differential casing and ring gear assembly 10 is in use, as well as a first axle bore 26, a second axle bore 28, and two pinion shaft bores 30, 32. All of the bores 26, 28, 30, 32 extend through the elongated body 16 and communicate with the interior chamber 24. The first axle bore 26 extends from the interior chamber 24 through the first axle hub 20 along the axis of rotation 18 of the casing 12, and the second axle bore 28 extends from the interior chamber 24 through the second axial hub 22 along the axis of rotation of the casing 12 in diametric alignment with the first axle bore 26. The two pinion shaft bores 30, 32 are defined by a central portion 34 of the elongated body 16 between the first and second axle hubs 20, 22. The two pinion shaft bores 30, 32 are defined opposite from one another and have a shared axis 36 oriented perpendicular to the axis of rotation 18 of the casing 12.

The differential casing 12 additionally includes an integral attachment flange 38 that surrounds and projects radially outwardly from the elongated body 16. A centerplane 40 of the attachment flange 38 is offset from the shared axis 36 of the pinion shaft bores 30, 32 towards the first axle hub 20. The attachment flange 38 has an axially facing annular front surface 42, an axially facing annular back surface 44, and a circumferential edge surface 46 that connects the front and back surfaces 42, 44 and defines an outer diameter of the flange 38. In this particular embodiment, the first axle hub 20 projects beyond the axially facing annular back surface 44 of the attachment flange 38 along the axis of rotation 18 of the casing 12 in a first direction and, consequently, the second axial hub 22 projects beyond the axially facing annular front surface 42 of the flange 38 along the axis of rotation 18 of the casing to a greater extent in a second direction that is parallel to and opposite the first direction. The axially facing annular front surface 42 turns outwardly from an annular exterior seating surface 48 of the central portion 34 of the elongated body 16 and provides a peripheral joining surface of the differential casing 12 at which the casing 12 and the ring gear 14 are fusion welded.

The differential casing 12 is constructed from ductile cast iron. Ductile cast iron has an alloy composition that includes iron as a main alloy constituent along with 3.2 wt % to 3.6 wt % carbon, 2.2 wt % to 2.8 wt % silicon, and one or more nodulizing elements selected from magnesium or cerium. For example, a common alloy composition for ductile iron includes 3.2 wt % to 3.6 wt % carbon, 2.2 wt % to 2.8 wt % silicon, 0.1 wt % to 0.2 wt % manganese, 0.03 wt % to 0.04 wt % magnesium, 0.005 wt % to 0.04 wt % phosphorus, 0.005 wt % to 0.02 wt % sulfur, 0 wt % to 0.40 wt % copper, and the balance iron with industry accepted impurities. Other ductile alloy compositions may include additional elements such as nickel, tin, and/or chromium. Ductile iron has good torsional strength, impact and fatigue resistance, and wear resistance, and its enhanced ductility (compared to grey cast iron) can be attributed to the fact that precipitated carbon takes the shape of spherical graphite nodules that are dispersed within an iron-based matrix that usually includes pearlite and/or ferrite. The spherical graphite nodules are formed as a result of the nodulizing elements, which interact with graphite precipitates and force isotropic growth into spheroids, and when dispersed throughout the iron-based matrix tend to inhibit the creation of cracks in response to stress.

The ring gear 14 includes an annular body 50 that has a profiled annular front surface 52, an annular back surface 54, an inner circumferential surface 56 that connects the front and back surfaces 52, 54 and defines a central opening 58 while providing an inner diameter of the ring gear 14, and an outer circumferential surface 60 that also connects the front and back surfaces 52, 54 but provides an outer diameter of the ring gear 14. The profiled annular front surface 52 defines a plurality of radially-extending gear teeth 62 that are circumferentially spaced around the central opening 58 of the ring gear 14. The gear teeth 62 may be curved (as shown) or straight. On the opposite side of the annular body 50, the annular back surface 54 includes an axially-projecting circular ridge 64 that surrounds the central opening 58 and protrudes beyond the surrounding portions of the back surface 54. The axially-projecting circular ridge 64 terminates in an axially facing annular plateau surface 66, which is essentially a positively displaced portion of the annular back surface 54. The axially facing annular plateau surface 66 of the axially-projecting circular ridge 64 provides a peripheral joining surface of the ring gear 14 at which the ring gear 14 and the differential casing 12 are fusion welded.

The ring gear 14 is constructed from case hardened low carbon alloy steel in this particular embodiment. Low carbon alloy steel has an alloy composition that includes iron as a main alloy constituent and up to 4.0 wt % alloying elements including 0.17 wt % to 0.23 wt % carbon plus at least one other non-impurity alloying element. For example, the other non-impurity alloying elements may be nickel, chromium, and molybdenum (i.e., a nickel-chromium-molybdenum low carbon alloy steel) or chromium and manganese (i.e., a chromium-manganese low carbon alloy steel). In the former steel, the alloy composition may include 0 wt % to 1.85 wt % nickel, 0 wt % to 1.3 wt % chromium, and 0 wt % to 0.4 wt % molybdenum, while in the latter steel the alloy composition may include 0.6 wt % to 1.3 wt % chromium and 0.8 wt % to 1.4 wt % manganese. Several commercially available grades of low carbon alloy steel that are useful in constructing the ring gear 14 include 43xxM, 86xxM, and 51xxM steels. Low carbon alloy steel is suitable for the ring gear 14 because it exhibits good wear and fatigue resistance while also being machinable.

The annular body 50 of the ring gear 14 is case hardened to further improve the wear resistance of at least the gear teeth 62 defined in the profiled annular front surface 52. Case hardening by carburizing involves infusing carbon into the annular body 50 to a specified case depth at an elevated temperature, e.g., 850° C. to 1090° C., at which the added carbon is dissolved in a solid solution of stable austenite phase of the steel. The carbon may be diffused into the annular body 50 from a carbon-rich gaseous or liquid environment. Once the desired amount of carbon has been infused into the annular body 50 at the desired case depth, the annular body 50 is quenched, typically in oil or a water-based polymer solution, to transform the austenite phase of the steel within the case depth into harder martensite phase. To that end, the annular body 50 may comprise an uncarburized bulk steel portion 68 having the alloy composition (for low carbon alloy steel) as described above, and an outer carburized hardened case 70 that overlies the uncarburized bulk steel portion 68 and has the same alloy composition described above but with 0.6 wt % to 1.0 wt % carbon or, more narrowly, with 0.7 wt % to 0.9 wt % carbon. The carburized hardened case 70 is usually about 1.5 mm thick.

If the ring gear 14 is case hardened, the outer carburized hardened case 70 is preferably not present at the axially facing annular plateau surface 66 of the axially-projecting circular ridge 64 as a result of the annular body 50 not being cased hardened in that area or from selective removal of the outer carburized hardened case 70. That is, the axially facing annular plateau surface 66 and preferably the entire the axially-projecting circular ridge 64 of the annular back surface 54 is part of an exposed portion 72 of the uncarburized bulk steel portion 68, as illustrated. The outer carburized hardened case 70 may be prevented from forming along the designated exposed portion 72 of the ring gear 14 by masking that part of the annular body 50 during case hardening. Or, alternatively, the outer carburized hardened case 70 may be selectively removed from the annular body 50 following case hardening to derived the designated exposed portion 72 of the ring gear 14 by any of a variety of techniques. For example, a defined portion of the outer carburized hardened case 70 may be selectively removed by hard turning.

To fusion weld the differential casing 12 and the ring gear 14 together, the two ferrous alloy components 12, 14 are brought together in preparation for welding. This involves sliding the ring gear 14 relative to the differential casing 12 so that the ring gear 14 moves past the second axle hub 22 and over the central portion 34 of the elongated annular body 16 of the casing 12. As shown best in FIGS. 1-2, the ring gear 14 is positioned so that the annular back surface 54 of the annular body 50 of the ring gear 14 contacts the axially facing annular front surface 42 of the attachment flange 38 to establish a faying interface where fusion ultimately occurs. More specifically, in the particular embodiment shown, the axially facing annular plateau surface 66 of the axially-projecting circular ridge 64 of the ring gear 14 contacts the axially facing annular front surface 42 of the attachment flange 38. Additionally, the inner circumferential surface 56 of the annular body 50 of the ring gear 14 is frictionally seated against the annular exterior seating surface 48 of the central portion 34 of the elongated body 16 of the casing 12. Prior to bringing the differential casing 12 and the ring gear 14 together, the portion of the outer carburized hardened case 70 of the annular body 50 of the ring gear 14 may be selectively removed to derive the exposed portion 72 of the uncarburized bulk steel portion 68, if needed.

Generally speaking, the differential casing 12 and the ring gear 14 are not inherently well-suited for fusion welding. The carbon content of the ductile iron alloy (3.2-3.6 wt %) that constitutes the differential casing 12 is significantly greater than 0.5 wt %. Additionally, while the carbon content of the low carbon alloy steel (0.17-0.23 wt %) that constitutes the uncarburized bulk steel portion 68 of the ring gear 14 is not itself overly problematic, the carbon equivalency of the alloy steel is greater than 0.5 wt % due to the presence of the other alloying elements. The carbon equivalency of the low carbon alloy steel is calculated by the following equation:

$$CE = C + \frac{Mn}{6} + \frac{(Cr + Mo + V)}{5} + \frac{(Ni + Cu)}{15}$$

At this carbon content and carbon equivalency of the alloy compositions of the differential casing 12 and the ring gear 14, respectively, the hardness of the alloys increases and, consequently, the weldability of the alloys decreases due to martensite and ledeburite formation within the fusion zone and the surrounding heat-affected zone when the molten material created during the prescribed welding operation solidifies rapidly. Martensite and ledeburite microstructures, in turn, are more susceptible to various forms of cracking including quench cracking from thermal shock and/or hydrogen induced cold cracking.

According to practices of the disclosed welding method, however, the differential casing 12 and the ring gear 14 can be successfully fusion welding together by a concentrated energy source despite their high carbon content and high carbon equivalency. To facilitate fusion welding, and referring now to FIG. 2, a setback notch 74 is defined in the axially facing annular front surface 42 of the attachment flange 38 and, similarly, a complimentary setback notch 76 is defined in the axially facing annular plateau surface 66 of the axially-projecting circular ridge 64 of the ring gear 14. The setback notch 74 in the attachment flange 38 is continuous and extends circumferentially around the axially facing annular front surface 42 adjacent to the circumferential edge surface 46 of the flange 38. In that regard, the setback notch 74 is defined by an axial shoulder surface 78 and a radial shoulder surface 80 of the axially facing annular front surface 42. The axial shoulder surface 78 is a segment of the axially facing annular front surface 42 that deviates axially inwardly into the flange 38, and the radial shoulder surface 80 is a segment of the axially facing annular front surface 42 that extends radially between the axial shoulder surface 78 and the circumferential edge surface 46 of the flange 38, as shown best in FIG. 2.

Figure 2:
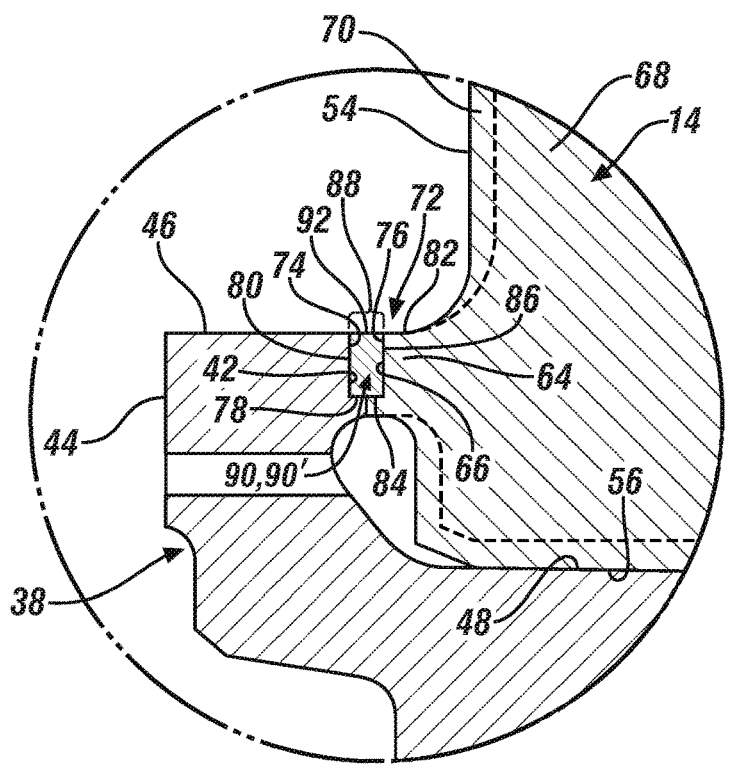
FIG. 2 is a partial magnified view of a portion of the attachment flange of the differential casing and a portion of the ring gear that together cooperate to form a circumferential groove in which a low carbon steel band in the form of a ring is placed according to one embodiment of the present disclosure.

The setback notch 76 in the ring gear 14 is also continuous and, similar to the setback notch 74 in the attachment flange 38, extends circumferentially around the axially facing annular plateau surface 66 adjacent to a side surface 82 of the axially-projecting circular ridge 64. In particular, the setback notch 76 is defined by an axial shoulder surface 84 and a radial shoulder surface 86 of the axially facing annular plateau surface 66. The axial shoulder surface 84 is a segment of the axially facing annular plateau surface 66 that deviates axially inwardly into the circular ridge 64, and the radial shoulder surface 86 is a segment of the axially facing plateau surface 66 that extends radially between the axial shoulder surface 84 and the side surface 82 of the circular ridge 64, as depicted in FIG. 2. When the differential casing 12 and the ring gear 14 are brought together, the axially facing annular front surface 42 of the casing 12 and the axially facing annular plateau surface 66 of the ring gear 14 are facially aligned an in contact so that their respective setback notches 74, 76 cooperate to define a circumferential groove 88 around the casing 12 and ring gear 14. Accordingly, each of the differential casing 12 and the ring gear 14 defines part of the circumferential groove 88.

The circumferential groove 88 is provided to receive a low carbon steel band 90. The low carbon steel band 90 is placed in the circumferential groove 88 and, when received in the groove 88, has an exposed upper edge surface 92. The low carbon steel band 90 has an alloy composition that includes 0.01 wt % to 0.1 wt % carbon and the balance iron. Other alloying elements are not intentionally included in the alloy composition of the low carbon steel but may nonetheless be present in the alloy composition at 1.0 wt % or less in the aggregate. Low carbon steel is ductile and is deemed to have good weldability on account of its low carbon content and low carbon equivalency. The low carbon steel band 90 can thus function as a carbon mediator during welding, as will be discussed in further detail below. In a preferred implementation, as illustrated here, the low carbon steel band 90 is a low carbon steel ring 90' that is placed in the circumferential groove 88 and encircles the differential casing 12 and the ring gear 14. The low carbon steel ring 90' has a circumference that may be continuous or, alternatively that may have a break to more easily allow the ring 90' to be opened and located initially within the circumferential groove 88 followed by closing of the ring 90' to nestle the ring 90' within the groove 88.

Figure 3:
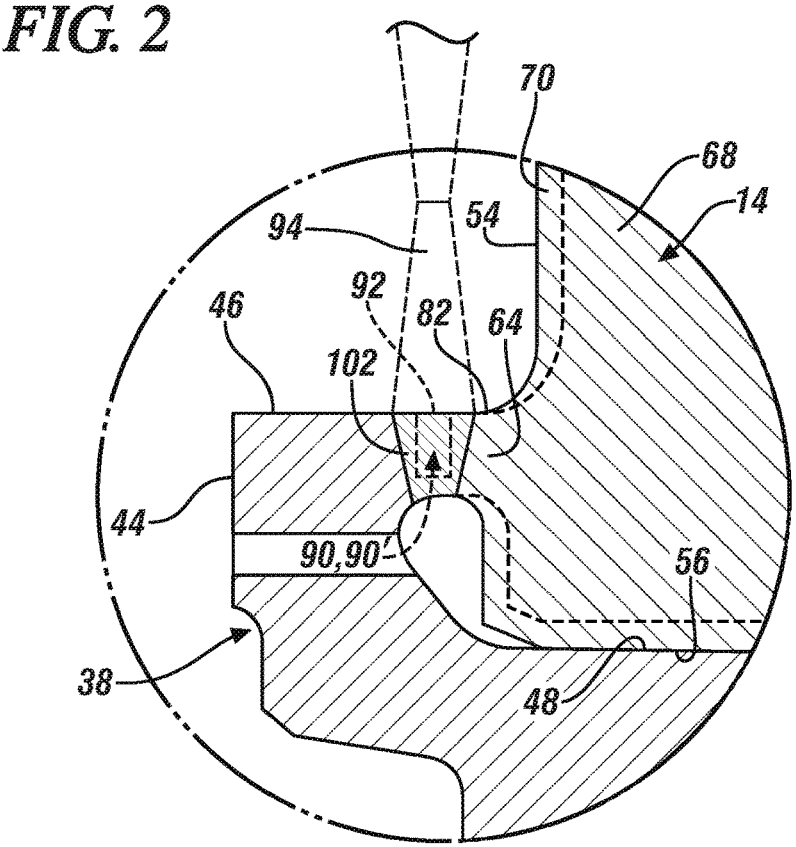
FIG. 3 is a partial magnified view of the portion of the attachment flange of the differential casing and the portion of the ring gear illustrated in FIG. 2 during fusion welding of the differential casing and the ring gear using a concentrated energy source according to one embodiment of the present disclosure.
Figure 4:
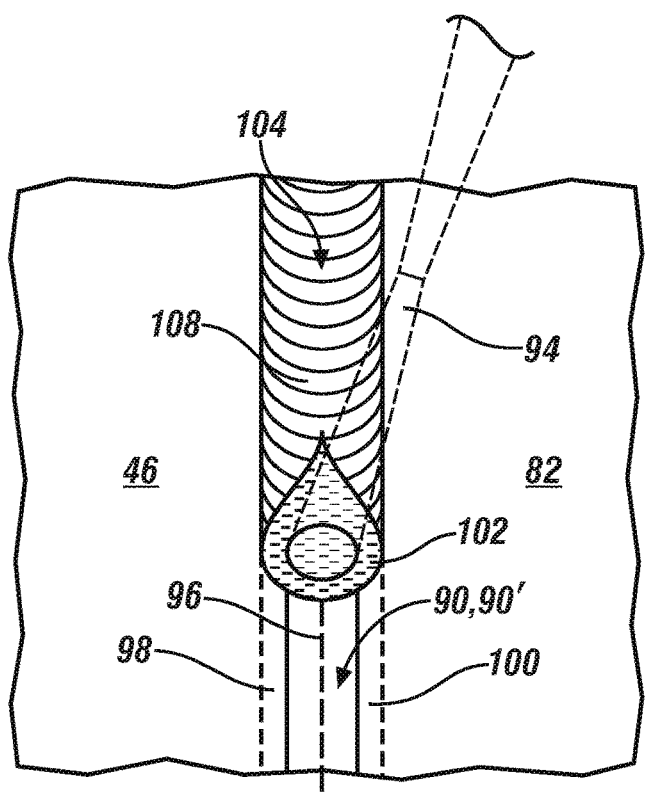
FIG. 4 is a partial magnified plan view of the portion of the attachment flange of the differential casing and the portion of the ring gear depicted in FIG. 3 during fusion welding of the differential casing and the ring gear according to one embodiment of the present disclosure.

After placing the low carbon steel ring 90' into the circumferential groove 88, and referring now to FIGS. 3-4, a concentrated energy source 94 is directed towards and impinges at least the steel ring 90' at the upper edge surface 92 of the ring 90'. The concentrated energy source 94 also preferably impinges the attachment flange 38 at the circumferential edge surface 46 of the flange 38 as well as the ring gear 14 at the side surface 82 of the axially-projecting circular ridge 64 of the ring gear 14, as shown. Then, as shown best in FIG. 4, the concentrated energy source 94 is conveyed along a welding line 96 that overlaps the low carbon steel ring 90'. The welding line 96 is the path the impingement area of the concentrated energy source 94 follows during its conveyance relative to the differential casing 12 and the ring gear 14. This path overlaps at least the entire circumference of the low carbon steel ring 90'. The impingement by the concentrated energy source 94 and the energy absorbed therefrom causes the low carbon steel ring 90, an adjacent portion 98 of the attachment flange 38 of the differential casing 12, and an adjacent portion 100 of the axially-projecting circular ridge 64 of the annular back surface 54 of the ring gear 14 to melt.

The molten metal obtained from the low carbon steel ring 90, the portion 98 of the attachment flange 38 of the differential casing 12, and the portion 100 of the axially-projecting circular ridge 64 of the ring gear 14 mixes to form a blended alloy weld pool 102 that penetrates radially inwardly into the attachment flange 38 and the axially-projecting circular ridge 64. The concentrated energy source 94 is conveyed along the welding line 96 around the entire circumference of the low carbon steel ring 90', typically by rotating the differential casing 12 and the ring gear 14 relative to the concentrated energy source 94, or vice versa, to achieve relative movement between the impingement area of the concentrated energy source 94 and the component parts 12, 14. In this way, and as shown best in FIG. 4, the blended alloy weld pool 102 is translated along the welding line 96 around the differential casing 12 and the ring gear 14, and in the process the weld pool 102 flows around and elongates behind the impingement area of the advancing concentrated energy source 94. The low carbon steel ring 90' is fully melted and consumed within the blended alloy weld pool 102 along with molten material from the adjacent portions 98, 100 of the differential casing 12 and ring gear 14. The blended alloy weld pool 102 solidifies into a fusion weld joint 104 behind the concentrated energy source 94 as the concentrated energy source 94 moves forward along the welding line 96.

Figure 5:
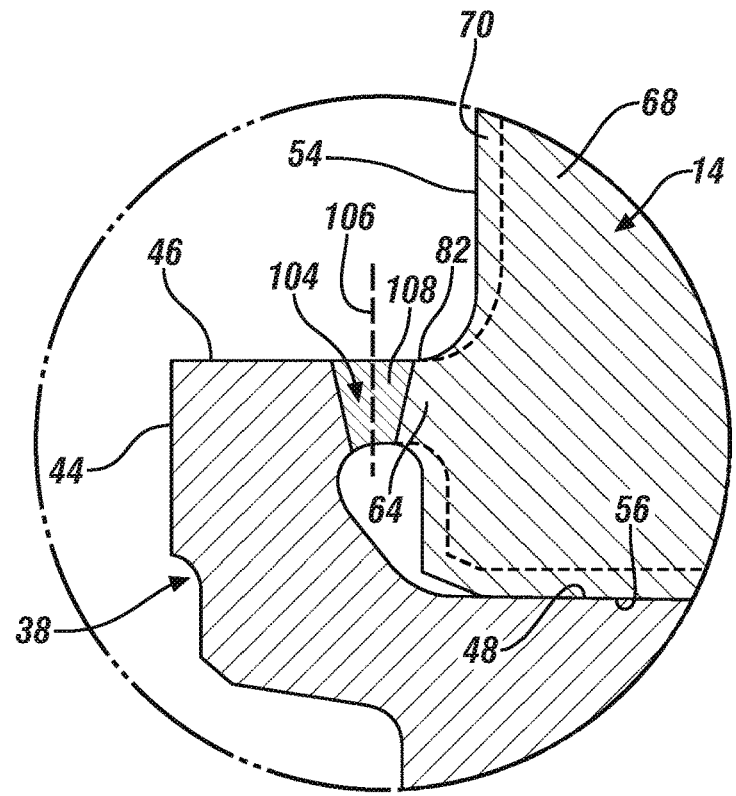
FIG. 5 is a partial cross-sectional view of a differential casing and ring gear assembly after the casing and the ring gear have been fusion welded together according to one embodiment of the present disclosure.

As shown in FIG. 5, the weld joint 104 circumscribes the differential casing 12 and the ring gear 14 such that a full circumference of the joint 104 is intersected by a plane 106 oriented perpendicular to the axis of rotation 18 of the differential casing 12. The weld joint 104 includes a weld bead 108 that extends radially inwardly into the attachment flange 38 and the axially-projecting circular ridge 64—and, in fact, as shown here, may fully traverse the axially-projecting circular flange 64—to thereby fusion weld the differential casing 12 and the ring gear 14 together. In that regard, the weld bead 108 integrates at least part of the faying interface established between the annular back surface 54 of the annular body 50 of the ring gear 14 and the axially facing annular front surface 42 of the attachment flange 38. The weld bead 108 is composed of resolidified iron-based alloy material derived from the blended alloy weld pool 102. Consequently, the weld bead 108 of the weld joint 104 is composed only of native alloy material from the differential casing 12, the ring gear 14, and the low carbon steel ring 90'. And because of the relatively low carbon content of the low carbon steel ring 90', the alloy composition of the weld bead 108 includes less carbon (on a wt % basis) than each of the alloy composition of the ductile cast iron of the differential casing 12 and the alloy composition of the uncarburized bulk steel portion 68 of the ring gear 14.

The weld joint 104 is sufficient on its own to remediate the weldability challenges associated with high carbon and high carbon equivalency ferrous alloys such as the ones from which the differential casing 12 and the ring gear 14 are constructed. This is because the low carbon content of the low carbon steel ring 90'—which contributes at least 50% more molten metal to the blended alloy weld pool 102 by weight than the adjacent portions 98, 100 of the differential casing 12 and the ring gear 14 combined—can effectively dilute the higher carbon content/eqiuvalency molten metal contributions from the adjacent portions 98, 100 of the differential casing 12 and ring gear 14. The blended alloy weld pool 102 can assimilate and dilute the higher carbon content/equivalency molten metal while maintaining a carbon content and a carbon equivalency that more closely resembles that of the highly weldable alloy composition of the low carbon steel ring 90'. As such, when the blended alloy weld pool 102 solidifies into the weld joint 104, martensite and ledeburite microstructures generally do not form within the weld bead 108 or the surrounding heat-affected zone. The weld bead 108 of the weld joint 104 is thus better able to withstand various forms of cracking compared to a weld joint formed directly between the differential casing 12 and the ring gear 14 without the aid of the low carbon steel ring 90' as described herein.

The concentrated energy source 94 that is used to melt the low carbon steel ring 90' and the adjacent portions 98, 100 of the differential casing 12 and ring gear 14 is preferably a laser beam, although other alternatives are certainly feasible including an electron beam, a MIG welding arc, or a TIG welding arc. The laser beam may be a solid-state laser beam or a gas laser beam. Some notable solid-state lasers that may be used are a fiber laser, a disk laser, a direct diode laser, and a Nd:YAG laser, and a notable gas laser that may be used is a $CO_2$ laser, although other types of lasers may certainly be used. When using a laser beam as the concentrated energy source 94, foreign metal is preferably not introduced into the blended alloy weld pool 102 via a filler wire or any other additive source apart from, of course, the low carbon steel ring 90'. In particular, nickel is not introduced into the blended alloy weld pool 102 by concurrently melting a nickel filler wire with the laser beam and, as a result, nickel is excluded from the alloy composition of the weld bead 108. Nickel is not needed as a crack mitigating element within the blended alloy weld pool 102 and the weld joint 104 derived therefrom because the low carbon content of the low carbon steel ring 90' can adequately neutralize crack susceptibility as discussed above.

The fusion welding of the differential casing 12 and the ring gear 14 completes the manufacture of the differential casing and ring gear assembly 10. The weld joint 104 joins the two component parts 12, 14 together and obviates the need to use mechanical fasteners to achieve the same result. The weld joint 104 has been shown to provide good strength when subjected to the torsional loading of an ultimate torsional load test. In an ultimate torsional load test, the ring gear (modified to have a square cross section) is held stationary within a square holding block, and the differential casing is clamped by a rotating head member that applies a twisting force to the casing about the axis of rotation of the casing. This twisting force applies a torsional load to the weld joint that fusion welds the ring gear and the differential casing together. To test the weld joint strength, five differential casing and ring gear assemblies where manufactured in accordance with the present disclosure using a laser beam as the concentrated energy source without a filler wire. The five differential casing and ring gear assemblies were each subjected to an ultimate torsional load test in which 16,505 Nm (Newton-meters) of torque was applied to the weld joints. None of the weld joints failed or showed any signs of damage at that torsional loading.

Figure 6:
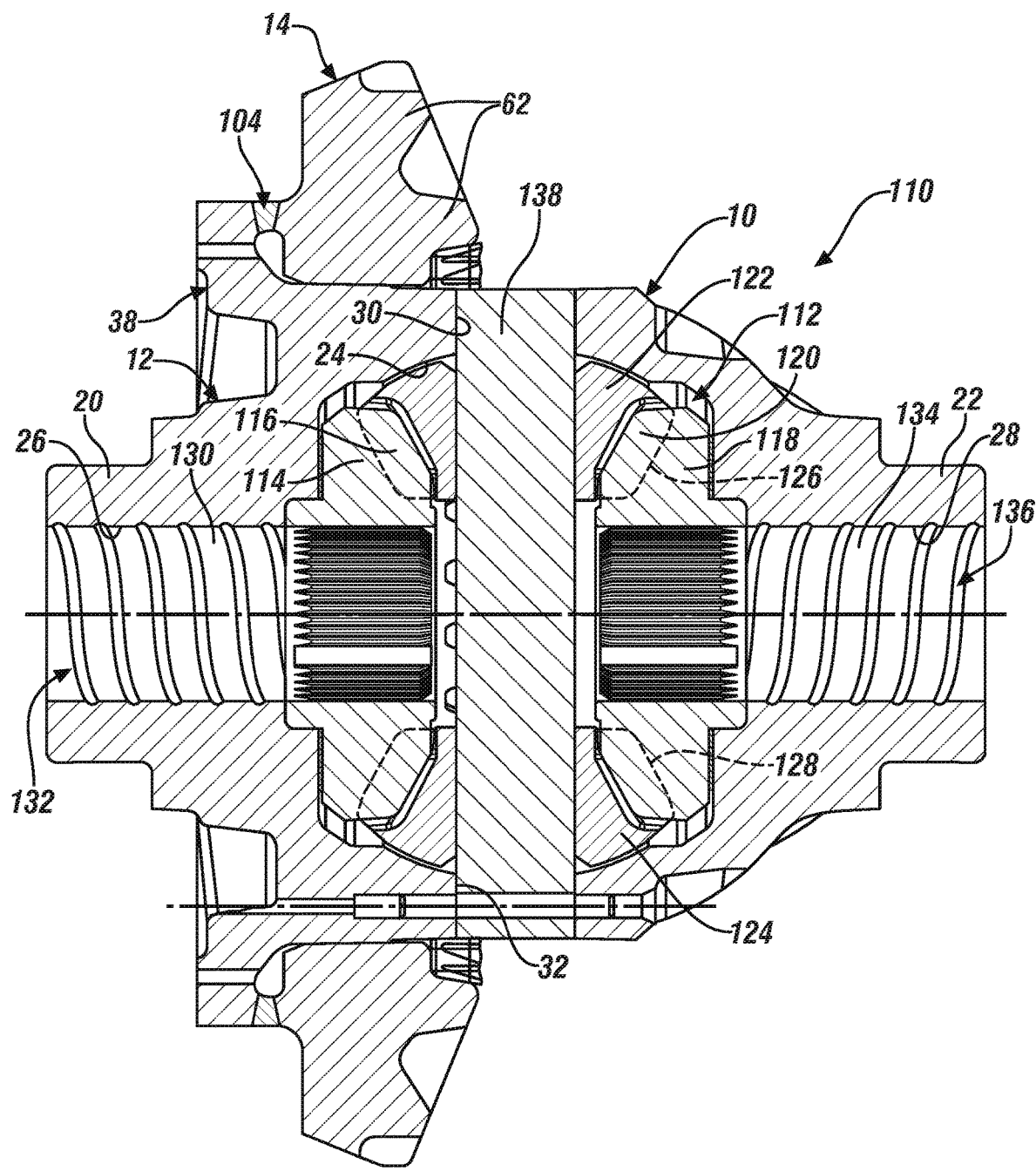
FIG. 6 is a cross-sectional view of a differential that includes the differential casing and ring gear assembly along with a differential gear set housed therein and first and second axle shafts engaged with the differential gear set according to one embodiment of the present disclosure.

Referring now to FIG. 6, the differential casing and ring gear assembly 10 may be used to further manufacture a differential 110 for installation within a motor vehicle drivetrain. To assemble the final differential 110, a differential gear set 112 is mounted within the interior chamber 24 of the differential casing 12. The differential gear set 112 includes a first side gear 114 having inwardly-disposed gear teeth 116, a second side gear 118 having inwardly-disposed gear teeth 120 that face the inwardly-disposed gear teeth 116 of the first side gear 114, and two opposed spider bevel gears 122, 124 that include gear teeth 126, 128 intermeshed with the inwardly-disposed gear teeth 116, 120 of the first and second side gears 114, 118. The first side gear 114 is splined to a threaded end portion 130 of a first axle shaft 132 that is received through the first axle bore 26 of the first axle hub 20 and, likewise, the second side gear 118 is splined to a threaded end portion 134 of a second axle shaft 136 that is received through the second axle bore 28 of the second axle hub 22. Additionally, the two spider bevel gears 122, 124 are rotatably supported at opposite ends of a pinion shaft 138 that is received in the opposed pinion shaft bores 30, 32 defined in the differential casing 12. When installed in a motor vehicle drivetrain, the gear teeth 62 of the ring gear 14 are intermeshed with the gear teeth of a drive pinion gear (not shown).

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of fusion welding two ferrous alloy component parts, wherein at least one of the ferrous alloy component parts is considered unweldable, the method comprising:
    providing a first ferrous alloy component part of ductile cast iron, the first ferrous alloy component part having a surface that defines a notch, the first ferrous alloy component part having an alloy composition that includes 3.2 wt % to 3.6 wt % carbon or a carbon equivalency of 3.2 wt % to 3.6 wt % carbon;
    providing a second ferrous alloy component part of uncarburized bulk steel portion, the second ferrous alloy component part having a surface that defines a notch, the second ferrous alloy component part having an alloy composition that includes 0.17 wt % to 0.23 wt % carbon or a carbon equivalency of 0.17 wt % to 0.23 wt % carbon, the ductile cast iron to be joined with the uncarburized bulk steel portion;
    bringing the first ferrous alloy component part and the second ferrous alloy component part together so that the notch defined in the surface of the first component part and the notch defined in the surface of the second ferrous alloy component part cooperate to form a groove;
    placing a low carbon steel band into the groove, the low carbon steel band having an alloy composition that includes 0.01 wt % to 0.1 wt % carbon;
    impinging the low carbon steel band with a concentrated energy source and conveying the concentrated energy source along a welding line that overlaps the low carbon steel band to melt the steel band along with an adjacent portion of the first ferrous alloy component part and an adjacent portion of the second ferrous alloy component part to form a blended alloy weld pool that solidifies into a weld joint that fusion welds the first and second ferrous alloy component parts together, the weld joint having an alloy composition that includes less carbon than each of the alloy composition of the ductile cast iron and the alloy composition of the uncarburized bulk steel portion of the ring gear;
    wherein the weld joint is formed between the attachment flange of the differential casing and an axially-projecting circular ridge that protrudes beyond surrounding portions of an annular back surface of the ring gear, the annular back surface of the ring gear being opposite a profiled annular front surface of the ring gear that defines a plurality of gear teeth, the entire of the axially-projecting circular ridge being part of an exposed portion of the uncarburized bulk steel portion.

2. The method set forth in claim 1, wherein each of the notch defined in the surface of the first ferrous alloy component part and the notch defined in the surface of the second ferrous alloy component part extends circumferentially around its respective surface to form a circumferential groove around the first and second ferrous alloy component parts, and wherein the low carbon steel band that is placed into the circumferential groove is a low carbon steel ring.

3. The method set forth in claim 1, wherein the concentrated energy source is a laser beam, and wherein foreign metal is not introduced into the blended alloy weld pool via a filler wire.

4. The method set forth in claim 1, wherein the first ferrous alloy component part is a differential casing and the second ferrous alloy component part is a ring gear.

5. The method set forth in claim 4, wherein the differential casing includes an attachment flange having an axially facing annular front surface that defines a continuous notch extending circumferentially around the axially facing annular front surface, wherein the ring gear includes an annular back surface and the profiled front surface defining the plurality of gear teeth, the annular back surface including the axially-projecting circular ridge terminating in an axially facing annular plateau surface that defines a continuous notch extending circumferentially around the axially facing annular plateau surface, and wherein the continuous notch defined in the axially facing annular front surface of the attachment flange and the continuous notch defined in the axially facing annular plateau surface of the ring gear cooperate to form a circumferential groove around the differential casing and the ring gear.

6. The method set forth in claim 5, wherein the low carbon steel band that is placed into the circumferential groove is a low carbon steel ring, and wherein the low carbon steel ring is fully melted by the concentrated energy source and, thus, is fully incorporated into the weld joint.

7. A method of fusion welding two ferrous alloy component parts, wherein at least one of the ferrous alloy component parts is considered unweldable, the method comprising:
sliding a ring gear over an elongated body of a differential casing to bring an annular back surface of the ring gear into contact with an axially facing annular front surface of an attachment flange of the differential casing, the ring gear being constructed from an outer hardened case overlying low carbon uncarburized bulk steel having an alloy composition that includes 0.17 wt % to 0.23 wt % carbon and the differential casing being constructed from ductile cast iron having an alloy composition that includes 3.2 wt % to 3.6 wt % carbon, the ductile cast iron to be joined with the uncarburized bulk steel portion, and wherein the annular back surface of the ring gear and the axially facing annular front surface of the attachment flange of the differential casing cooperate to form a circumferential groove around the ring gear and the differential casing;
placing a low carbon steel ring into the circumferential groove, the low carbon steel ring having an alloy composition that includes 0.01 wt % to 0.1 wt % carbon; and
impinging the low carbon steel ring with a concentrated energy source and conveying the concentrated energy source along a welding line that overlaps the low carbon steel ring to fully melt the steel ring along with an adjacent portion of the ring gear and an adjacent portion of the differential casing to form a blended alloy weld pool that solidifies into a weld joint that circumscribes and fusion welds the ring gear and differential casing together, the weld joint having an alloy composition that includes less carbon than each of the alloy composition of the ductile cast iron and the alloy composition of the uncarburized bulk steel portion of the ring gear;
wherein the weld joint is formed between the attachment flange of the differential casing and an axially-projecting circular ridge that protrudes beyond surrounding portions of an annular back surface of the ring gear, the annular back surface of the ring gear being opposite a profiled annular front surface of the ring gear that defines a plurality of gear teeth, the entire of the axially-projecting circular ridge being part of an exposed portion of the uncarburized bulk steel portion.

8. The method set forth in claim 7, wherein the concentrated energy source is a laser beam, and wherein foreign metal is not introduced into the blended alloy weld pool via a filler wire.

9. The method set forth in claim 7, wherein the ductile cast iron of the differential casing has an alloy composition that includes iron along with 3.2 wt % to 3.6 wt % carbon, 2.2 wt % to 2.8 wt % silicon, and one or more nodulizing elements selected from magnesium or cerium.

10. The method set forth in claim 7, wherein a continuous circumferential notch defined in the annular back surface of the ring gear and a continuous circumferential notch defined in the axially facing annular front surface of the attachment flange of the differential casing cooperate to form the circumferential groove.

11. The method set forth in claim 10, wherein the continuous notch defined in the annular back surface of the ring gear is defined in an axially facing annular plateau surface of an axially-projecting circular ridge that protrudes beyond surrounding portions of the annular back surface.

12. A differential casing and ring gear assembly comprising:
a differential casing including an elongated body that extends along an axis of rotation of the casing between a first axle hub and a second axle hub, the differential casing further including an attachment flange that surrounds and extends radially outwardly from a central portion of the elongated body located between the first axle hub and the second axle hub, the differential casing being constructed from ductile cast iron having an alloy composition that includes 3.2 wt % to 3.6 wt % carbon;
a ring gear including an annular body having an inner circumferential surface that is frictionally seated against an exterior surface of the central portion of the elongated body of the differential casing, the ring gear being constructed from case hardened low alloy carbon steel such that the ring gear has an uncarburized bulk steel portion and an outer carburized hardened case overlying the uncarburized bulk steel portion, the ductile cast iron to be joined with the uncarburized bulk steel portion, the uncarburized bulk steel portion having an alloy composition that includes 0.17 wt % to 0.23 wt % carbon; and
a weld joint that circumscribes the attachment flange of the differential casing and the annular body of the ring gear and fusion welds differential casing and the ring gear together, the weld joint having an alloy composition that includes less carbon than each of the alloy composition of the ductile cast iron and the alloy composition of the uncarburized bulk steel portion of the ring gear
wherein the weld joint is formed between the attachment flange of the differential casing and an axially-projecting circular ridge that protrudes beyond surrounding portions of an annular back surface of the ring gear, the annular back surface of the ring gear being opposite a profiled annular front surface of the rind gear that defines a plurality of gear teeth, the entire of the axially-projecting circular ridge being part of an exposed portion of the uncarburized bulk steel portion.

13. The differential casing and ring gear assembly set forth in claim 12, wherein the weld joint is formed at a portion of the annular body of the ring gear where the outer carburized hardened case is not present.

* * * * *